US006215871B1

(12) United States Patent
Conolly et al.

(10) Patent No.: US 6,215,871 B1
(45) Date of Patent: Apr. 10, 2001

(54) SANITARY COVER FOR TELEPHONE AND METHOD OF MAKING SAME

(76) Inventors: Brendan Conolly, 532 W. 50th St., Apt. 1A, New York, NY (US) 10019; Jamie Kalikow, 428 Columbus Ave.; Peter C. Leeds, 15 W. 75th St., Suite 7B, both of New York, NY (US) 10023

( * ) Notice: Subject to any disclaimer, the term of this patent is extended or adjusted under 35 U.S.C. 154(b) by 1010 days.

(21) Appl. No.: 08/642,595

(22) Filed: May 3, 1996

Related U.S. Application Data

(63) Continuation of application No. 08/296,498, filed on Aug. 26, 1994, now abandoned.

(51) Int. Cl.[7] ..................................................... H04M 1/00
(52) U.S. Cl. ............................................ 379/452; 379/439
(58) Field of Search .................................... 379/452, 439, 379/451, 437, 447; 215/12.2, 12.1, 13

(56) References Cited

U.S. PATENT DOCUMENTS

| | | | |
|---|---|---|---|
| 756,543 | 4/1904 | Thompson | 379/452 |
| 901,869 | 10/1908 | Baumgarten | 379/452 |
| 1,345,734 | 7/1920 | Baer | 379/452 |
| 1,400,334 | 12/1921 | Weinrich | 379/452 |
| 1,493,557 | 5/1924 | Meadoff | 379/452 |
| 1,741,668 | 12/1929 | Wilson | 379/452 |
| 1,833,643 | 11/1931 | Gluck | 379/452 |
| 1,834,199 | 12/1931 | Barr | 379/452 |
| 1,946,617 | 2/1934 | Elboz | 379/452 |
| 1,962,639 | 6/1934 | Drummond-Dick | 379/452 |
| 2,650,269 | 8/1953 | Webb | 379/452 |
| 3,169,171 | 2/1965 | Wachs et al. | 379/452 |
| 3,304,379 | 2/1967 | Memmel et al. | 379/452 |
| 3,663,259 * | 5/1972 | Barriere | 215/12.2 |
| 4,098,177 | 7/1978 | Olney et al. | 99/310 |
| 4,361,457 | 11/1982 | Keeler et al. | 156/224 |
| 4,486,628 * | 12/1984 | Thompson | 379/439 |
| 4,736,418 | 4/1988 | Steadman | 379/452 |
| 4,819,264 | 4/1989 | Lemley | 379/452 |
| 4,852,163 | 7/1989 | Caceres | 379/452 |
| 4,876,715 | 10/1989 | Neubert | 379/452 |
| 4,953,703 | 9/1990 | Virginio | 379/452 |
| 5,054,063 | 10/1991 | Lo et al. | 379/452 |

FOREIGN PATENT DOCUMENTS

| | | | |
|---|---|---|---|
| 395193 * | 12/1965 | (CH) | 379/452 |

* cited by examiner

*Primary Examiner*—Jack Chiang
(74) *Attorney, Agent, or Firm*—Ostrolenk, Faber, Gerb & Soffen, LLP

(57) ABSTRACT

A sanitary cover for a telephone mouthpiece or earpiece has a central portion and side portions. The side portions have a retaining member formed thereon for engaging in a groove of a standard telephone mouthpiece. The retaining members allow the sanitary cover to be mounted and held securely on a telephone mouthpiece during use and are easily removed from the telephone mouthpiece when the cover is no longer needed. A method of forming a sanitary cover for a telephone mouthpiece involves cutting at least a first and second sheet of flexible material to have first and second physical dimensions, respectively. The first and second sheets are molded to the shape of a standard telephone mouthpiece and are mechanically bonded together. The difference in physical dimensions between the first and second sheets forming the cover allow the cover to retain its shape even though the covers are folded and stacked for storage and packaging.

10 Claims, 2 Drawing Sheets

SANITARY COVER FOR TELEPHONE AND METHOD OF MAKING SAME

This is a continuation of application Ser. No. 08/296,498 filed on Aug. 26, 1994, now abandoned.

BACKGROUND OF THE INVENTION

A. Field of the Invention

This invention relates to a sanitary cover for a telephone mouthpiece or earpiece and a method of making a sanitary cover, and more particularly, to a telephone cover that is securely mountable on a standard telephone earpiece or mouthpiece and will retain a desired shape during use.

B. Description of the Prior Art

Sanitary covers for telephone mouthpieces and earpieces have existed since not long after the invention of the telephone. Given the increasing risk of infection from various highly contagious diseases and viruses existing today, the need for an effective sanitary telephone mouthpiece cover to prevent the spread of these diseases and viruses is even greater. Although many telephone mouthpiece covers have been produced in the past, these covers do not retain a desired shape and do not remain in position on the telephone mouthpiece or earpiece to enable a telephone user to use the telephone without worrying about whether the sanitary cover will fall off of the telephone.

U.S. Pat. No. 5,054,063 teaches a sanitary telephone cover comprising disposable sheets for covering the sound transmitting members of a telephone. The telephone cover is formed of a plurality of layers of material which are mechanically bonded together, for example, by using an adhesive. The inventors of this cover realized that sanitary telephone covers frequently do not remain in position on the telephone during use. Accordingly, the '063 device is provided with adhesive on two tabs 22, 29 which are folded to surround the sound transmitting members of the telephone. The adhesive applied to the tabs 22, 29 holds the sanitary cover on the sound transmitting portions of the telephone. However, the use of adhesive increases the steps and cost of manufacturing the sanitary telephone cover. The use of adhesive on the tabs also prevents the sanitary covers from being stacked one upon another because the adhesive would cause all of the covers to adhere together and prevent removal of one of the covers from the stack.

U.S. Pat. No. 4,852,163 also discloses a telephone mouthpiece cover which is formed from a single piece of paper board. The cover has a skirt 12 and a top 14 for covering the telephone mouthpiece. The cover is formed with ribs 44 which add structural integrity to the skirt 12 and also facilitate attachment of the cover on the mouthpiece by providing a gripping action. However, as seen in FIG. 3, none of the ribs 44 actually grip the telephone mouthpiece to securely hold the cover on the telephone. Thus, the ribs do not provide an adequate holding mechanism for affixing the cover on the telephone mouthpiece. In fact, the ribs force the surface of the skirt portion away from the surface of the telephone mouthpiece such that the only points of contact between the skirt and the telephone mouthpiece are the ribs 44. Thus, the ribs 44 decrease the contact area between the skirt and the telephone mouthpiece thereby decreasing the retaining ability of the skirt on the mouthpiece.

U.S. Pat. No. 1,493,557 discloses a sanitary telephone cover formed of paper or fabric having a central portion 8 and an outer skirt portion 8*a* which forms a resilient holding means for holding the cover on the telephone mouthpiece. The holding portion 8*a* is creased along a plurality of pairs of lines indicated by numeral 9 wherein each of the pairs of lines 9*b*, 9*c* etc. intersect corresponding corners 8*b*, 8*c*, respectively, of the central portion 8. The skirt 8*a* has resilient overlapping portions formed therein which form the holding means for holding the shield on the mouthpiece. However, the holding means for this cover is merely created by folds in the skirt portion which often do not provide adequate holding pressure. Also, the skirt portion may lose its resiliency and shape which would cause the skirt to be unable to hold the cover on the telephone mouthpiece.

U.S. Pat. No. 1,400,334 teaches a telephone mouthpiece cover which includes two sections 7 and 8. The first section 7 is conical and fits inside of the telephone mouthpiece. The second portion 8 is a flat outer covering which includes an edge portion 11 folded inwardly and crimped to engage the edges of the telephone mouthpiece. However, the outer edges 11 are merely folded about the edge of the telephone mouthpiece and can easily be dislodged because there is nothing to hold the outer edges 11 onto the telephone mouthpiece. Also, the cover requires that the first conical section 7 be positioned inside of the telephone mouthpiece to prevent the telephone mouthpiece cover from being dislodged from the telephone mouthpiece.

SUMMARY OF THE INVENTION

It is evident from the above discussion of the prior art telephone mouthpiece and sound transmitting covers that there exists a need for an improved telephone mouthpiece cover which is easily and securely mounted on a telephone mouthpiece or earpiece without the use of adhesive. Also, there is a need for an improved method of making a sanitary mouthpiece cover.

At least one embodiment of the present invention provides a sanitary cover for use with a telephone mouthpiece and/or earpiece which overcomes the problems of the prior art discussed above. The present invention has several advantageous features which allow the sanitary telephone mouthpiece cover to be securely mounted on a telephone mouthpiece cover and be engaged with a recess formed in a telephone handset.

According to another embodiment of the invention, an improved method of making a sanitary cover for a telephone mouthpiece or earpiece is described in which the resulting cover will retain its shape throughout packaging and use. According to another feature of the invention, a preferred method of forming a telephone mouthpiece cover involves the use of an uneven tension in forming the layers of the mouthpiece cover.

According to at least one embodiment of the present invention, a sanitary cover for a telephone mouthpiece or earpiece includes a central portion, a skirt portion extending from the central portion, and at least one projection formed on the skirt portion and adapted to engage in a groove formed in a telephone handset.

Another embodiment of the present invention provides a method of forming a sanitary cover for a telephone mouthpiece or earpiece, the method comprising the steps of forming a first layer to have first physical dimensions, forming a second layer to have second physical dimensions different from the first physical dimensions, mounting the first layer on a mold having the shape of one of a telephone mouthpiece and a telephone earpiece, applying an adhesive solution to the first layer, placing the second layer on the first layer held on the mold and applying an adhesive solution to the second layer and the first layer.

A sanitary cover according to one embodiment of the present invention is formed by a layer or layers of a resilient material having a natural friction, such as tissue or other suitable material. Preferably, the material used to form the layers is recyclable. The layers of resilient material are molded to the shape of a standard public telephone mouthpiece and/or earpiece. The telephone mouthpiece cover includes retaining means which fit into a groove formed in the standard public telephone handset for retaining the telephone mouthpiece cover in position during use. This retaining means is easily removed from the groove formed in the telephone handset so that the cover can be discarded after use.

The telephone mouthpiece cover is formed so as to retain its shape despite being folded, stacked and packaged for convenient transport of the covers. This desired result is achieved by using the concept of uneven tension which is explained in detail in the following paragraphs.

In a preferred embodiment, at least two layers of a flexible material having a natural friction, for example tissue, are bonded together and dried while being form-fittingly held on a mold having a shape corresponding to a shape of a standard public telephone mouthpiece or earpiece. The two layers are precut to have two different sizes or slightly different dimensions. Once dry, neither layer is able to return to its original unmolded shape because the other layer disposed in opposing relation thereto. In order for either of the two layers to return to its original unmolded shape, one layer would have to expand at a rate different from the other layer disposed in opposing relation thereto because the two layers are slightly different in dimension. In addition, the layers are unable to return to their original unmolded shape because they are joined together by the use of an adhesive or other suitable means.

This concept is best described as uneven tension. The two layers forming the inventive telephone mouthpiece cover have a slightly different shape from each other and are joined together to form the telephone mouthpiece cover. Because these two layers have a slightly different shape, this creates an uneven tension which allows the cover to retain its shape. That is, because the two layers have slightly different dimensions and are joined by the use of an adhesive or other suitable means, each layer is prevented from expanding or returning to its original unmolded shape. Therefore, the cover is able to retain the molded shape.

As can be understood, more than two layers can be used to form the sanitary cover of the present invention. Each of the additional layers used to form the cover should preferably have physical dimensions and a shape different from those of the first and second layers to further increase the amount of uneven tension between the layers and assist in retaining the shape of the cover.

In addition, any or all of the layers forming the cover can have a disinfectant or anti-bacterial solution applied thereto for increasing the germ and virus fighting function of the cover. This solution can be applied to each layer as the cover is being formed or can be applied after the cover has been formed.

The retaining means described above is preferably formed to be a projection which projects into a groove formed in the standard telephone handset. The projection may also include an additional material other than the flexible material used for forming the cover to provide increased stability and ability to hold the cover on the telephone mouthpiece.

For example, the projection may be formed from an elastic, metal or other suitable material and may be formed in a circular, hoop shape to surround the telephone mouthpiece or earpiece. This additional material used to form the projection can be added to the cover by bonding or other suitable methods. Also, the skirt portion of the cover can have a loop formed therein for mounting the projection on the cover. The projection may also be hook-shaped and be inserted in a skirt portion of the cover to retain the projection in the cover.

In a method of making the telephone cover according to one embodiment of the invention, a mold of a standard public telephone mouthpiece or earpiece is obtained and used. A first layer of flexible material such as tissue having a first set of physical dimensions is precut and fit over the telephone mouthpiece mold. The first layer is sprayed with a diluted adhesive or other suitable material causing the first layer to become wet.

While the first layer is still wetted, a second layer which is precut to have second physical dimensions different from the first physical dimensions is placed on top of the wetted first layer on the mouthpiece mold. These layers are joined together by the diluted adhesive and then are dried while still being held on the mold. Then, a diluted mucilage or adhesive is sprayed onto the first and second layers held on the mold causing the first and second layers to be wetted. The wetted sheets cling to the telephone mouthpiece mold because of surface attraction. Both layers are allowed to dry while still clinging to the mold.

The diluted adhesive is applied between the two layers and does not allow the two layers to stick to the mold. Once the two layers have dried, the cover is removed from the mold and folded for packaging.

The above described methods can be readily and easily used in mass producing each of the various embodiments of the sanitary covers.

Other features and advantages of the present invention will become apparent from the following description of the invention which refers to the accompanying drawings.

Figure 1:
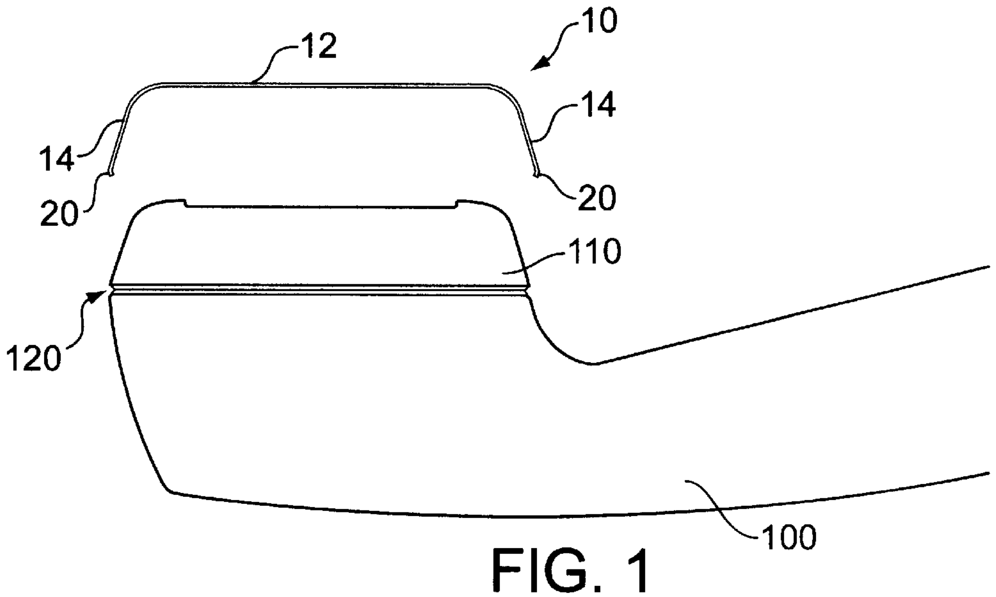
FIG. 1 illustrates one embodiment of a telephone mouthpiece cover of the present invention including a retaining means for retaining the cover on a telephone mouthpiece.

For the purpose of illustrating the invention, there is shown in the drawings several forms which are presently preferred. It is understood, however, that the invention is not limited to the precise arrangements and instrumentalities shown.

DETAILED DESCRIPTION OF A PREFERRED EMBODIMENT

Figure 2:
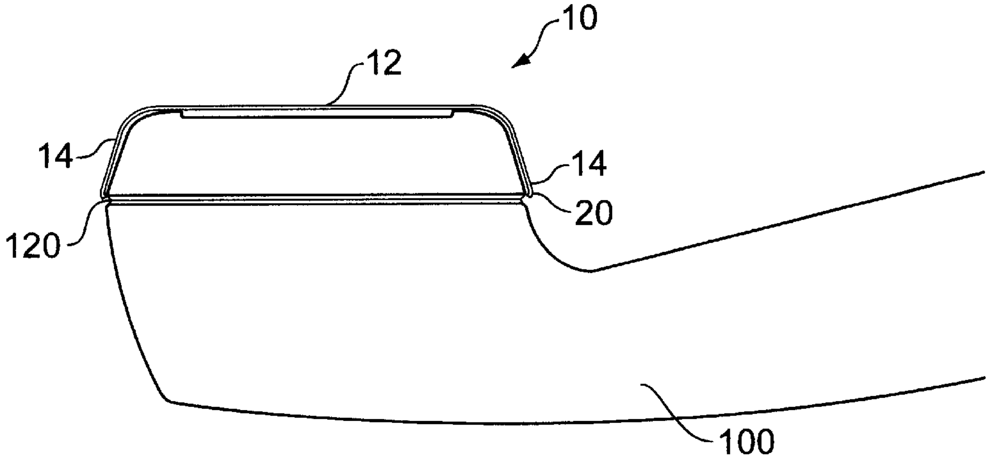
FIG. 2 illustrates another embodiment of a telephone mouthpiece cover of the present invention in which the retaining means is engaged in a groove formed in the telephone handset.

Referring to the drawings, wherein like numerals indicate like elements, there is shown in FIGS. 1 and 2 a sanitary cover 10 for engaging either a telephone mouthpiece 110 or a telephone earpiece (not shown) of a standard public telephone. The telephone handset 100 has a groove 120 formed therein at a point where the telephone handset 100 meets the mouthpiece 110.

The sanitary cover 10 has a central portion 12 and skirt portion 14 that extends from the central portion 12. The skirt portion 14 has a substantially continuous circular or rectangular shape and fits over the telephone mouthpiece 110. The shape of the skirt portion 14 can easily be changed to fit a shape of any telephone mouthpiece or earpiece.

The skirt portion 14 also preferably includes a retaining means 20 formed so as to fit within the groove 120 formed in the telephone handset 100. The retaining means 20 is located on a lower edge of the continuous skirt portion 14 so as to form a continuous, substantially circular or rectangular shaped member.

The retaining means 20 is preferably formed as a projection member which projects into the groove 120 forms a preferably hook-shaped portion at the lower edge of the skirt portion 14. The projection member is formed so as to securely fasten and hold the cover 10 on the telephone mouthpiece 110 and/or earpiece. The retaining means 20 may be formed by the same material used to form the telephone cover 10.

Alternatively, an additional material may be used to form the retaining means 20 so as to provide increased structural integrity to the retaining means. For example, the retaining means 20 may be formed of a metal or elastic material having shape corresponding to a shape of the telephone earpiece for surrounding the mouthpiece 110 and fitting within a groove 120 that extends around an entire mouthpiece 110 or earpiece.

The cover 10 is formed to fit snugly over the mouthpiece or earpiece. Once the cover 10 is positioned on the telephone mouthpiece or earpiece, the retaining means 20 are fitted into the groove 120 to ensure that the cover 10 is securely held on the telephone mouthpiece 100 or earpiece as shown in FIG. 2.

Figure 3:
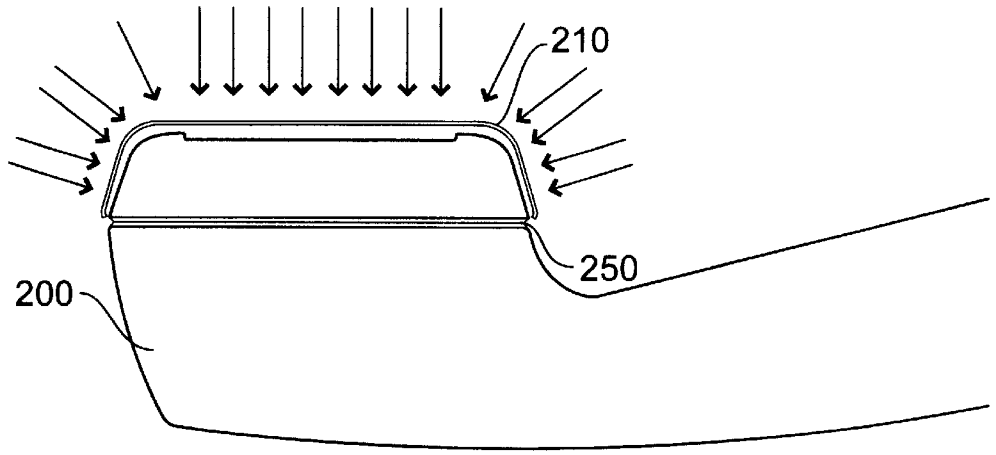
FIG. 3 is a schematic view of a first step in a method of forming a telephone mouthpiece cover according to another embodiment of the present invention.

FIG. 3 shows a first method step of forming a telephone cover according to a preferred embodiment of the present invention. A mold 200 having a shape substantially corresponding to a shape of a standard telephone mouthpiece is obtained and used to form the telephone mouthpiece cover 10. The mold 200 has a groove 250 formed therein similar to the groove 120 described in connection with FIGS. 1 and 2.

A first layer of a flexible material 210, for example, tissue or other suitable and preferably recyclable material, is precut to have a first set of dimensions. The first layer 210 is placed overtop of the mold 200 and pressed onto the mold 200 so that the first layer 210 conforms to the shape of the mold 200. The ends of the first layer are inserted into the groove 250 formed in the mold 200. Pressure is applied to the lower end of the first layer to form the retaining means 20 so that the retaining means will be formed to project into a groove in a telephone handset.

Then, a mucilage or diluted adhesive is sprayed onto the first layer 210 against the mold 200 as shown by the arrows in FIG. 3. The first layer 210 becomes wet and clings to the mold 200.

Figure 4:
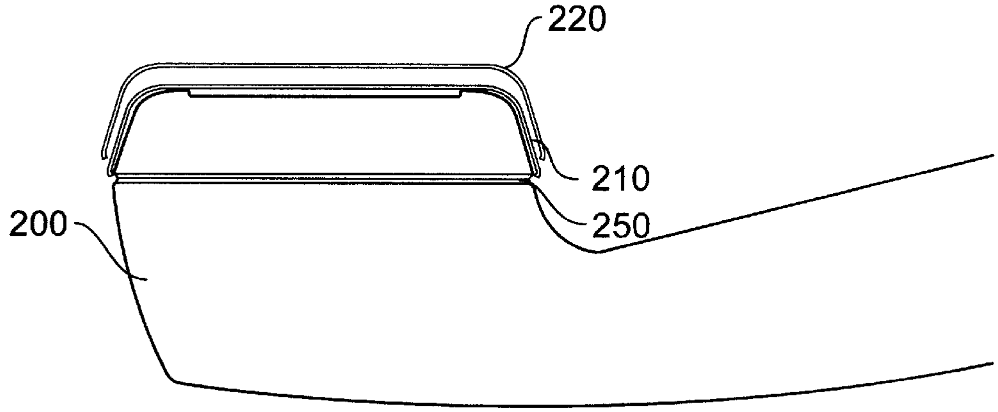
FIG. 4 shows a further step in the method of forming a telephone mouthpiece cover according to one embodiment of the invention.

As seen in FIG. 4, while the first layer 210 is still wet with the diluted adhesive, a second layer 220 of tissue or other suitable material, which is precut to have a second set of physical dimensions, is placed on top of the first layer 210 and the mold 200. The second layer 220 is pressed onto the first layer 210 to conform to the shape of the mold 200 including the groove 250 formed in the mold. As with the first layer, pressure is applied to the lower end of the second layer to form the retaining means. The first and second layers 210, 220 are allowed to dry while clinging to the mold. The first and second layers 210, 220 do not stick to the mold 200 because the diluted adhesive is only applied between the two layers and not between the layers and the mold.

Figure 5:
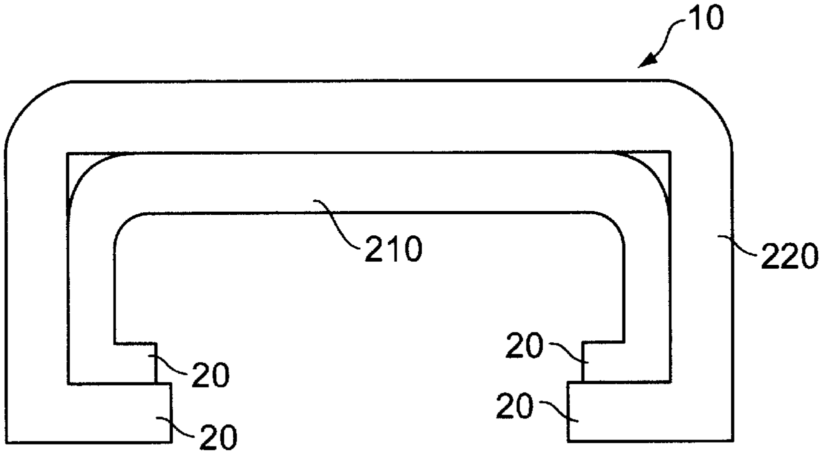
FIG. 5 shows a concept of uneven tension between two layers forming one embodiment of the sanitary cover of the present invention.

The first and second layers 210, 220 having first and second sets of dimensions is critical to the telephone mouthpiece cover 10 retaining its shape. The formation of the first and second layers 210, 220 having different shapes and physical dimensions takes advantage of the concept of uneven tension as shown in FIG. 5. It should be noted that the size of the components forming the cover shown in FIG. 5 has been exaggerated for clarity. Uneven tension is achieved when at least two layers having slightly different shapes and dimensions are joined together to create an uneven tension between the two layers. The uneven tension prevents either layer from returning to its original unmolded shape because the other opposing layer would have to expand at a different rate because it is slightly different in dimension and shape. Thus, by forming the cover to have at least two layers having different physical dimensions, the cover 10 can retain its shape.

The formation of the retaining means 20 at the lower end of skirt portion 14 of the cover 10 can be done by inserting the lower ends of the first and second layers into the groove 250 formed in the mold 200 of the telephone mouthpiece and applying pressure to the lower ends of the first and second layers as described above. The first and second layers are sprayed with adhesive as described above. Once the first and second layers have dried, the retaining means 20 will retain its shape under the action of the uneven tension forces. This uneven tension allows the retaining means 20 to retain its shape so that it can be inserted into a groove 120 formed in a standard telephone mouthpiece and fasten the sanitary cover on the mouthpiece.

Alternatively, the lower ends of the first and second layers 210, 220 can be inserted into the groove 250 simultaneously and have pressure applied thereto to form the retaining means. That is, when the first layer 210 is pressed onto the mold, the lower end of the first layer 210 is not inserted into the groove 250 until the second layer 220 is applied onto the first layer 210. As soon as the two layers have been joined, the lower ends of the two layers 210, 220 are inserted into the groove 250 and pressure is applied thereto to form the retaining means.

In another alternative embodiment, the retaining means 20 can be formed by adding an additional material onto the lower end of the first and second layers 210, 220 to provide stability and reinforce the retaining means 20 so that the retaining means 20 securely fastens the cover 10 to the groove 120 formed in a standard telephone mouthpiece. This additional material used to form the projection can be added to the cover by bonding or other suitable methods. The projection is added onto the lower end of the cover to provide the lower end with hook shape. The projection forming the hook shape is inserted into a groove in a telephone handset so as to hook the cover onto the telephone handset.

Once the two layers 210, 220 have dried, the cover is removed from the mold and folded for packaging. Several covers can be folded and packaged one on top of the other to be inserted into a container such as a cellophane or plastic housing for holding a plurality of stacked covers.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sanitary cover for a telephone mouthpiece or earpiece, the cover comprising:

a central portion;

a skirt portion extending from the central portion; and at least one projection formed on the skirt portion and adapted to engage in a groove formed in a telephone handset;

wherein said central portion and said skirt portion include a first layer and a second layer having different lengths, said first layer and said second layer are disposed on top of each other such that said first layer is connected to said second layer along an entire length of said second layer to form an uneven tension between said first and second layers.

2. The sanitary cover of claim 1, wherein said first layer and said second layer comprise a resilient material having natural friction.

3. The sanitary cover of claim 1, wherein said at least one projection is formed at a lower end of said skirt portion.

4. The sanitary cover of claim 1, wherein said at least one projection comprises a hook-shaped member.

5. The sanitary cover of claim 1, wherein said at least one projection is formed from a material different from a material used to form said central portion and said skirt portion.

6. The sanitary cover of claim 1, wherein said at least one projection comprises a continuous band connected to the skirt portion.

7. The sanitary cover of claim 1, wherein the band is formed from at least one of an elastic material and a metal material.

8. The sanitary cover of claim 1, wherein an anti-bacterial solution is applied to at least one of the central portion and the skirt portion.

9. The sanitary cover of claim 1, wherein the skirt portion and the central portion are made of a recyclable material.

10. A sanitary cover for a telephone mouthpiece or earpiece, the cover comprising:

a central portion;

a skirt portion extending from the central portion; and at least one projection formed on the skirt portion and adapted to engage in a groove formed in a telephone handset;

wherein said central portion and said skirt portion are both formed by a first layer and a second layer which are continuous and have different dimensions, said first layer and said second layer being disposed on top of each other with said first layer being connected to said second layer over the entire dimensions of said second layer to form an uneven tension between said first and second layers for maintaining a predetermined shape of said sanitary cover.

* * * * *